United States Patent Office 3,496,368
Patented Feb. 17, 1970

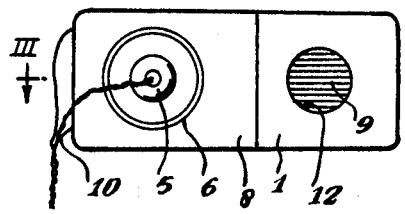
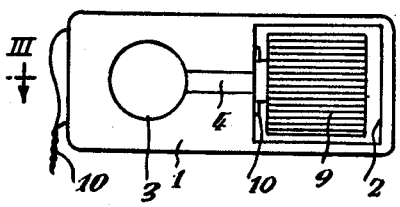
Fig. 1.   Fig. 2.
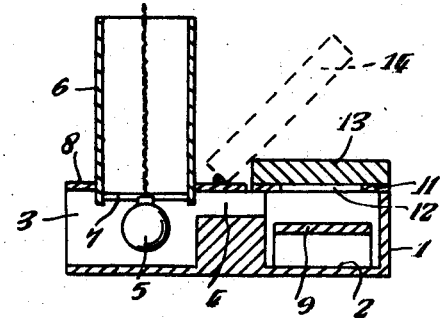
Fig. 3.
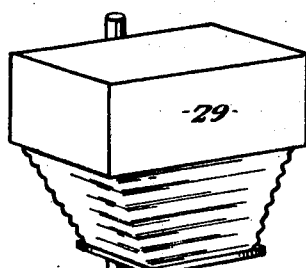
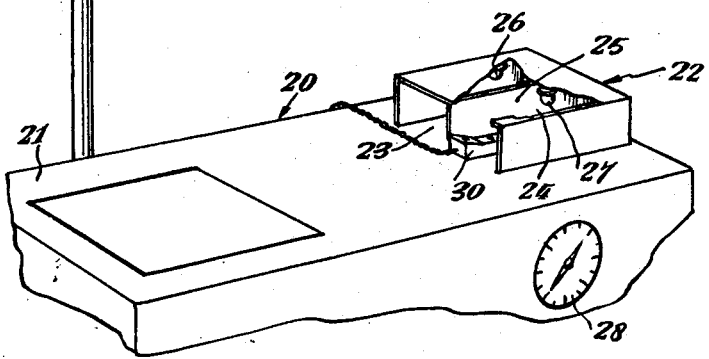
Fig. 4.

3,496,368
PHOTOELECTRIC PHOTOGRAPHIC APPARATUS WITH AUXILIARY LIGHT SOURCE FOR PRE-SENSITIZING PHOTOCELL
James R. Denner, Shepton Mallet, Somerset, England, assignor to W. H. Howson Limited, Leeds, Yorkshire, England, a company of England
Filed Mar. 21, 1967, Ser. No. 624,897
Claims priority, application Great Britain, Mar. 24, 1966, 12,946/66; June 30, 1966, 29,463/66
Int. Cl. G02f 1/28; H01j 39/12
U.S. Cl. 250—217    6 Claims

ABSTRACT OF THE DISCLOSURE

The specification discloses various means of exposing a photo-electric cell of the photo-resistive type to light to prepare it for use in illumination-intensity measurements. In one such means, a housing is provided on a photographic enlarger to shield the cell when it is not in use from all light except that deriving from a specially controlled electric light bulb, which presensitize the cell by illuminating it at a level equal to or slightly brighter than that at which the cell is about to be used.

In another embodiment the same illumination of the cell when not in use is provided from an electric light bulb within the body of the probe which also contains the cell.

Means are provided for correlating the level of illumination with the immediately intended use of the cell—e.g. in colour separation work the different levels of illumination at an easel through different filters can be anticipated by approximate setting of resistors in the circuit of the bulb.

Two such probes are suitably used on a single piece of apparatus, especially in colour separation work.

The probes are useful in cameras, in densitometers and other photographic apparatus.

Cross references

U.S. Ser. No. 629,055 (J. R. Denner), filed Mar. 30, 1967 and now abandoned; U.S. Ser. No. 621,264 (J. R. Denner), filed Mar. 7, 1967.

Background

This invention relates to light-sensitive probes for photographic processes. These have light-sensitive cells in them, usually photo-electric cells. I have found that the delay involved in the use of photo-electric cells (especially photo-resistive cells such as cadmium sulphide cells) in the determination of light values on the easel of an enlarger or for use with a reflection or transmission densitometer, or ink comparator, or for use in the focus plane of a camera or other similar devices, particularly at low light flux levels, is largely eliminated if the cell is exposed before use to illumination of a predetermined level.

Light-sensitive cells, particularly cadmium sulphide cells have the disadvantage that they take some considerable time to attain a final reading particularly when the light intensity they are measuring is low. To avoid this, I expose the cells to light before they are used. But to expose the cells to light very much brighter than that which is to be expected would have very little effect on the "rise" time because the effect would be, upon placing the cells in the image area, that the reading given by the cells would at first be too high, and then sink to a value below the true one before finally rising again to that true value. Ideally, therefore, the cells would be exposed to a light value identical with that which they are to receive, because then the "rise" time would be zero, but this, by the nature of things, is difficult to achieve because the cells are themselves to measure that value, which is not precisely known and I find the best compromise is to expose the cells to a light intensity slightly greater than that which is expected to be determined by them in use. The illumination intensity need not be known precisely.

The presensitizing light may be applied from a specially provided light source on the photographic apparatus with which the probes are to be used, or the probes may have each a self-contained light source.

Summary of invention

According to one aspect of the invention I provide a photographic apparatus having at least one light-sensitive probe for use in determining light values in the apparatus, and a light source specifically for illuminating the photo-electric cell of the light sensitive probe at a controlled level of light intensity. The said light source may be borne on the apparatus itself, to illuminate the photo-electric cell when the probe is in a position where it is not in use for light determintaion, or it may be borne within a body of the probe itself, to be a self-contained light source in the probe. In the latter case, preferably the cell is housed in a portion of the probe separated from a portion in which the source is housed except by a light passing channel to conduct light in the cell from the source. In the former case a housing may be provided for the reception of the cells when not in use having a lamp of which the intensity of the illumination is governed by the expected intensity of illumination at the photographic material during the exposure of which the light intensity is to be measured.

According to another aspect of the invention I provide a method of pre-sensitizing a photo-electric cell before use in determining a light value in preparation of photographic material, the method consisting in exposing such cell to illumination by light and controlling the intensity of the light. The method may comprise regulating the intensity of the light to be equal to or slightly greater than that expected to be determined by the probe.

Description of drawings

Particular embodiments of the invention and methods of carrying it out will now be described with reference to the accompanying drawings wherein:
FIGURE 1 is a plan view of an embodiment of probe,
FIGURE 2 is a plan view with part of the embodiment removed,
FIGURE 3 is a section on the line III—III, FIGURE 1, and
FIGURE 4 is a perspective view of an enlarger, with part cut away.

Particular embodiments

Referring first to FIGURES 1 to 3, a photo-electric light probe has a body formed from a base block 1 of opaque plastics material.

The block 1 is externally rectangular in plan, and has a recessed housing 2, 3 at its end. A trough in the upper surface of the block leads between the housings 2,3.

One housing, 3, is for the reception of low-voltage electric miniature light bulb 5 removably held in position to a metallic chimney 6 by a spring clip 7. The chimney 6 is cemented to an opaque plastics material lid plate 8 which extends approximately half the length of the block 1, and is cemented to the block. The chimney 6 permits heat generated by the bulb 5 to be dissipated, and also is useful as a handle.

The recessed housing 2 is for the reception of a cadmium sulphide photo-electric cell 9, leads 10 being taken through bores in the block 1 from the cell 9 to the outside of the block.

The recessed housing 2 and the cell 9 in it are covered by a first, opaque, white surfaced cover plate 11, having a central aperture 12, and by a block 13 of heat absorbent glass, all cemented together.

In use, the probe is coupled to a source of electrical power at controlled potential for its bulb 5 and to a microammeter to give readings from the cell 9.

The amount of potential required to be applied to the bulb 5 is determined by placing the probe on the easel of an enlarger so that the cell 9 receives light, through aperture 12, only from the light source of the enlarger, the bulb 5 being switched off.

The level of illumination on the aperture 12 is arranged to be approximately what is expected in actual use. The reading on the microammeter is taken. Then the light source of the enlarger is switched off, and the lamp 5 switched on, and the potential supplied to that lamp adjusted so that the reading given on the microammeter is equal to or slightly higher than its previous one. Light travels from the bulb to the cell 9 through the channel formed by the trough 4 and by diffraction and reflection from the undersurface of the plate 11. The level of illumination desired for the light source for this particular use is thus set.

During use of the enlarger, the bulb 5 is left burning the whole time except when the probe is actually on the easel for the purpose of taking a reading: minimum delay is then experienced before a steady reading is obtained.

Colour filters may be attached to or replace the glass 13; and I prefer to hingedly attach a protective cap 14 which covers the glass 13 while the probe is out of use or while the bulb 5 is lit. When the probe is taking a reading the cap 14 is pivoted to lie parallel to the chimney 6, and the action of opening the cap can operate a miniature microswitch which automatically opens the supply circuit to the minature light bulb 5.

In FIGURE 4 is shown a photographic enlarger 20 of which one side of the easel 21 has an open-fronted covered shelf 22. The covered shelf 22 is light proof (except through its open front), and is divided into two compartments 23, 24 by a light proof dividing wall 25. Each of the compartments 23, 24 has a low-wattage electric light bulb 26, 27 mounted on its ceiling. Leads to these bulbs come from a power source through a preset resistance. A switch 28 acts to switch on the bulbs 26, 27 when the light source (not shown) of the enlarger within the light box 29 is off, and switch them off when the light source of the enlarger is on.

The compartments 23, 24 are each for the reception of a light-sensitive probe such as 30, which is to be used on the easel 21 for determining light values in an image projected onto the easel. Two probes are provided here (only one being shown) for determining highlights and shadow light values of the image respectively in a single operation, and the settings of the resistances in series with bulbs 26, 27 are made accordingly, as will be described later.

If only one probe were required to be used, only one illuminated compartment 23 or 24 would be provided.

Light from the light sources in the compartments falls on photo-electric cells (not shown) within the probes and presensitizes them.

The more particular usefulness of such presensitization is in the preparation of colour separation records, where accuracy of results and time-saving are both important. A complication is that colour separation work for half-tone printing requires determination of the exposure needed in the flash and main exposures to be given to the photographic material. One of the probes is to be placed on the highlight part of the image formed in the easel, the other on the position of lowest intensity of that image. The method of determining flash and main exposures using two probes in this manner is fully disclosed in the specification of my co-pending United States patent application No. 629,055 filed Mar. 30, 1967. The probes are used before each separation is exposed and therefore will receive on the easel a light of varying intensity according to the different filters placed in position and according to the basic colour of the transparency being enlarged. In that different filters always cut down "white" light by a known amount, the ordinary level of illumination expected at the image area for each filter is known, and it can be arranged that series resistances in the circuits of the lamps (whether self-contained in the probe or borne on the enlarger) which give the cells their pre-sensitization cause each lamp to give the respective cell illumination just greater than that expected.

The flash and main exposures may be applied from the same light source by the method and means disclosed in the specification of my co-pending U.S. patent application No. 621,264, filed Mar. 7, 1967. The flash and main exposure may however be applied separately. In either case, their values are determined and adjusted by the help of the two probes.

The presensitization in this way of photoelectric cells in light-sensitive probes is applicable to photographic processes other than enlarging, e.g. transmission or reflection densitometry colour density comparison (in which, usually, only a single probe would be used) and light value determinations in the focal plane of a camera.

What I claim and desire to secure by Letters Patent is:

1. In combination in photographic apparatus which includes a first source of light (29) adapted to be switched on and off for illuminating photographic material and a photoresistive photoelectric cell (9, 30) adapted and arranged for measuring the intensity of the illumination of said photographic material by light from said first source, means for presensitizing said cell in accordance with the level of said intensity of illumination before said first source of light is switched on comprising a second source of light (5, 26, 27) of controllable intensity adapted to be switched on when the first source of light is off and adapted to supply light at approximately the intensity of said illumination of said photographic material, said second source of light being in position to direct light therefrom to said cell.

2. The combination set forth in claim 1 including a housing (2) in which said cell (9) is received and another housing (3) in which said second source of light (5) is received, and a light passing channel (4) connecting the housings for light from said second source of light to travel to said cell.

3. The combination set forth in claim 1 including at least one compartment (23, 24) adapted to receive a probe (30) carrying a photoresistive photoelectric cell (9) therein, said second source of light (26, 27) being mounted in said compartment for directing light therefrom to said cell when said probe is in the compartment.

4. The combination set forth in claim 3 including a switch (28) adapted to switch said second source of light (26, 27) on and off when said first source of light (29) is respectively off and on.

5. A method of presensitizing a photoresistive photoelectric cell before use in determining a light value from an exposure light source in preparation of photographic material, the method consisting in simulating the determination exposure by exposing such cell to illumination by light from an auxiliary light source and of an intensity slightly greater than that expected to be determined by it immediately before said exposure light source is turned on, and turning said auxiliary light source off when the exposure light source is turned on.

6. The method according to claim 5 comprising selecting a current value for determining the light intensity to be applied to a said cell by switching into the circuit of the said light source a selected one of a plurality of resistors in accordance with the colour of the light to be determined by the cell.

References Cited

UNITED STATES PATENTS

| | | | |
|---|---|---|---|
| 2,353,218 | 7/1944 | Burnham et al. | 250—205 |
| 2,668,474 | 2/1954 | Rogers | 250—217 |

ARCHIE R. BORCHELT, Primary Examiner

M. ABRAMSON, Assistant Examiner

U.S. Cl. X.R.

250—219